Figure 1:
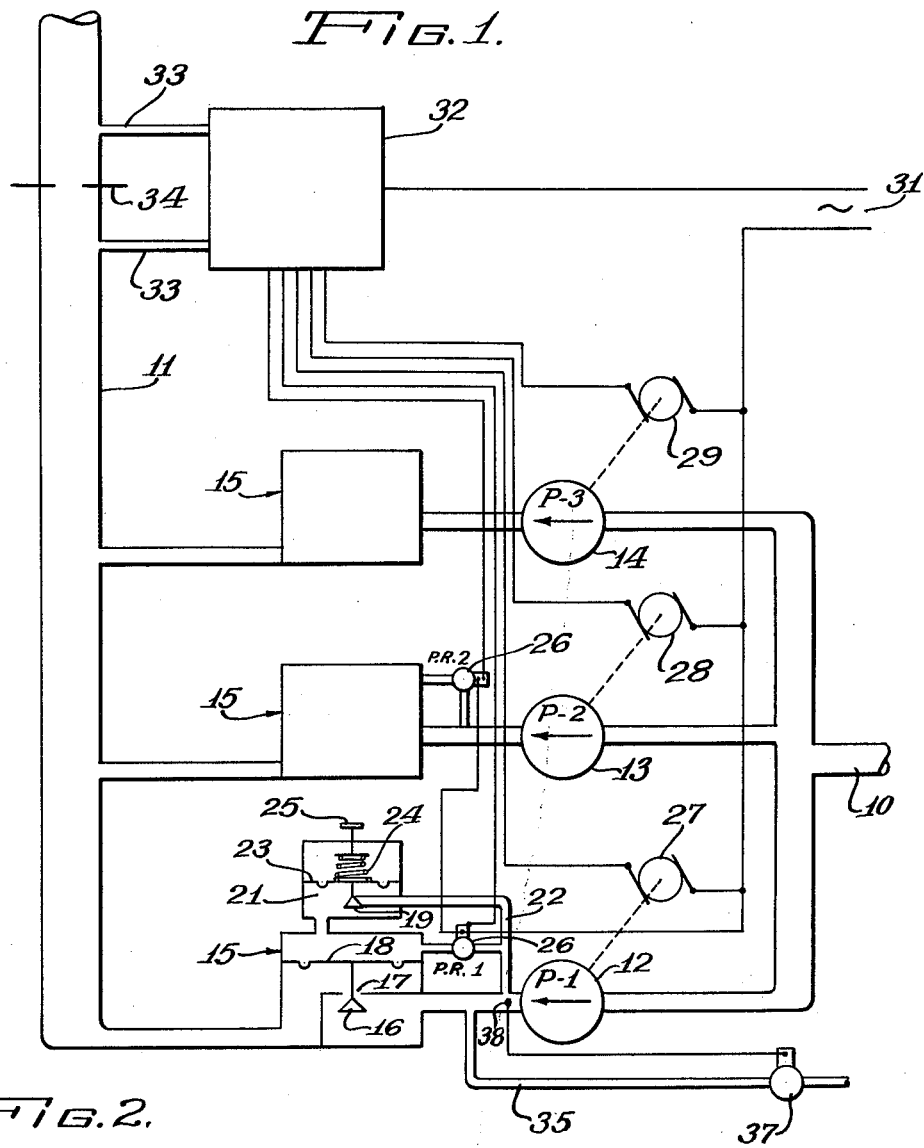

July 20, 1965 R. F. SCHAUB 3,195,555
TANKLESS PUMPING SYSTEM
Filed April 1, 1963

Inventor:
Robert F. Schaub

United States Patent Office 3,195,555
Patented July 20, 1965

3,195,555
TANKLESS PUMPING SYSTEM
Robert F. Schaub, La Grange, Ill., assignor to SyncroFlo, Inc., Downers Grove, Ill., a corporation of Illinois
Filed Apr. 1, 1963, Ser. No. 269,515
6 Claims. (Cl. 137—114)

This invention relates to a tankless pumping system and more particularly to a system for boosting water supply pressure for multi-story buildings, and the like.

Pressure booster systems have heretofore been employed in most relatively tall buildings to increase the pressure of the water as supplied through city mains for serving all of the floors of the building, including the upper floors. One such system is more particularly described and claimed in my co-pending application Serial No. 227,115, filed September 26, 1962. Such systems generally tend to maintain the same pump pressure regardless of fluctuations in demand, which normally results in a lower available pressure at the fixtures at times of high demand due to friction losses in the piping.

It is accordingly the principal object of the present invention to provide a tankless pumping system which will vary the pumping pressure as the demand changes to compensate for the friction losses, thus maintaining a substantially constant pressure on all fixtures regardless of flow demand.

Another object is to provide a tankless pumping system in which a plurality of pumps are connected in parallel and are provided with pressure regulators set at different values and further including control means to cause only the pump connected with the lower pressure regulator to operate below a predetermined demand rate and to cause both pumps to operate at a higher demand rate while at the same time causing the control for the lower pressure regulating valve to be bypassed.

According to a feature of the invention, the system comprises pumps of different sizes with the smallest pump having a pressure regulator set at a lower value and the controlling means functions to bring the smaller pump, then the larger pump, then both pumps, into operation as the demand rises. At the high demand when both pumps are functioning the pilot control for the pressure regulator for the smaller pump is bypassed so that the smaller pump can supply water to the main outlet line.

Systems employing three or more pumps are also contemplated in which the regulator for the pumps are set to maintain progressively higher values with the control means bringing the pumps into operation in different combinations to satisfy different demand rates and simultaneously causing the pilot controls for the lower pressure regulators for the pumps then in operation to be bypassed. A preferred combination which gives maximum economy of installation and operation utilizes a small pump of about 25% of system peak flow rate regulated to the lowest pressure and two larger pumps each of about 55% of system peak flow rate regulated to progressively higher pressure.

Figure 2:
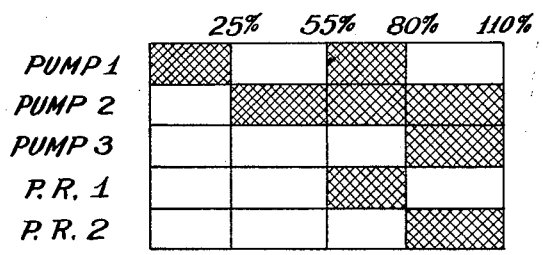

The above and other objects and features of the invention will be more readily apparent from the following description when read in connection with the accompanying drawing, in which:

FIG. 1 is a diagrammatic view of a tankless pumping system embodying the invention; and
FIG. 2 is an operating diagram.

The system, as shown, takes water from a supply source, indicated at 10, which may be the usual city water main or may lead to a tank or well which may or may not have a separate pump. The water taken from the source is pumped under increased pressure into a water supply conduit 11 which leads to various points of demand throughout the building.

In the system, as illustrated, three pumps are employed the first of which, indicated at 12, is a relatively low capacity pump, and the second and third of which, indicated at 13 and 14, are of greater capacity. The pumps 13 and 14 may be of the same capacity or of different capacities depending upon the exact system requirements, but are normally of the same capacity. Each of the pumps discharges into the water supply conduit 11 through a pressure regulating valve, indicated generally at 15. The lower pressure regulating valve for the pump 12 is illustrated diagrammatically and it will be understood that the other pressure regulating valves may be of similar construction.

As shown, each of the pressure regulating valves 15 comprises a main valve 16 movable toward and away from a port 17 through which water flows from the inlet to the outlet of the pressure regulating valve. The valve 16 is moved toward and away from the port 17 to throttle it more or less by a diaphragm 18 which is subjected on its lower surface to the discharge pressure of the regulating valve and on its upper surface to a pilot controlling pressure. The pilot controlling pressure is produced by a pilot regulator which is generally similar to the main regulator, as so far described, including a pilot valve 19 controlling a port 21. The valve 19 regulates the flow of water through a pilot conduit 22 leading from the discharge side of the pump to the upper side of the diaphragm 18. The valve 19 is controlled by a diaphragm 23 which is urged downwardly to open the valve 19 by a spring 24 which can be adjusted through an adjusting screw 25 to regulate the pilot pressure. In order to open the valve 16 fully when desired, as explained hereinafter, a solenoid controlled bypass valve 26 connects the conduit 22 directly to the upper surface of the diaphragm 18, as shown. The valve 26 is normally closed and is opened when its operating solenoid is energized.

The pressure regulator for the pump 12 is adjusted to a relatively low pressure and the regulators for the pumps 13 and 14 are adjusted for progressively higher pressures. As will appear hereinafter, this will produce an increased pressure supply to the supply conduit 11 in response to higher demands so that the pressures available at the various fixtures throughout the building will be maintained substantially constant. The pumps are driven respectively by motors 27, 28 and 29 which are shown as electric motors, although any other desired type of motor could be used. One side of each motor and one of the terminals of each of the solenoid valves 26 is connected to one side of a power source, indicated at 31. Circuits through the motors and solenoid valves are completed under the control of a flow regulator 32 which is responsive to the flow through the supply conduit 11. For this purpose, the flow regulator may be connected through conduits 33 to the opposite sides of an orifice or restriction 34 in the flow conduit. The flow regulator may be any desired type of commercial unit which will progressively operate switches to control circuits to the several motors and solenoid valves as the flow changes.

It is one of the features of the invention that the several pumps can be so proportioned and controlled with respect to each other as to provide the most economical system from the standpoint of cost and installation and of operation. For this purpose, the pump 12 is selected a have a capacity of approximately 25% of the peak system demand and the pumps 13 and 14 are selected so that each of them has a capacity of approximately 55% of the peak system demand. In this way, the full peak demand of the system can be satisfied by operating the two pumps 13 and 14 simultaneously and demands less than the peak demand can be satisfied by operating individual pumps or other combinations of pumps which will provide sufficient capacity to satisfy the existing demand without producing excessive capacity.

In one typical installation, as illustrated in the operating diagram, FIG. 2, the flow regulator is adjusted to close a circuit only to the motor 27 for the first pump when the capacity is below 25% of peak demand. Therefore, at low demands only this relatively small pump is being operated so that excessive pumping is eliminated or minimized and the operating cost is minimized. Should there be long periods of zero or substantially zero demand, there would be a tendency for the water to heat due to operation of the first pump without any flow or with minimum flow therethrough. Should this condition continue for a long period of time the water could be heated to an excess temperature. In order to avoid this a waste valve 37 is provided connected to the waste line 35 and is controlled by a bulb 38 at the outlet to the pump 12 to open when the temperature exceeds a predetermined value. The bulb 38 may also be located within the pump itself. Thus if the water should be excessively heated due to friction caused by operation of the pump at times of zero or minimum demand, the waste valve 37 will be opened to permit some of the heated water to flow to the sewer thereby admitting fresh cool water to the pump to prevent its temperature from rising to an excessive value.

When the demand for water by the system exceeds 25% of the peak demand the flow regulator 32 will interrupt the circuit to the motor 27 and will close a circuit to the motor 28 to cause the second pump only to operate. This pump can satisfy the demand up to 55% of the peak value and will continue to operate alone until the peak demand exceeds the 55% figure. When this occurs, the flow regulator 32 will operate to again energize the motor 27 and will simultaneously energize the solenoid valve 26 for the first pressure regulator. Under these conditions, both pumps 12 and 13 will supply water to the supply conduit 11, but the pressure regulator for the pump 12 will be wide open so that its discharge pressure is unregulated. The pump 12 will therefore supply water to the supply conduit 11 at a rate proportional to a function of the pump's head capacity curve, the pressure for which the second regulator 15 is set and the system flow demand. Under these conditions, pumps 12 and 13 can pump water into the supply conduit 11 and their total capacity will supply water at a rate up to about 80% of the peak system demand.

It will be noted that the great majority of system requirements can be satisfied by this combination of two pumps since the system will exceed 80% of the peak demand only on relatively rare occasions and for relatively short intervals. It will therefore rarely be necessary to operate both of the larger pumps 13 and 14 simultaneously although preferably these pumps may be alternated by changing the controls so that first one and then the other will function as the second pump. This is desirable to prevent any one pump from remaining inactive for an excessive period of time which might lead to the possibility of rusting or freeze-out. The changeover can be effected very simply by switching the controls in the flow regulator and by re-adjusting the pressure regulators 15 for the respective pumps.

Should the demand increase above 80% of the peak demand, however, the flow regulator 32 will function to de-energize the motor 27 and to energize both motors 28 and 29, as well as the bypass valve 26 for the second regulator. At this time, the two larger pumps will operate simultaneously to provide a nominal capacity of 110% of the peak demand. At the same time, the pressure regulator for the second pump which is set to a lower value than the pressure regulator for the third pump will be made ineffective so that both pumps can supply water to the supply conduit simultaneously and at a higher pressure.

While the exact pressure for which the regulators are adjusted will vary from system to system, it is contemplated that the regulator for pump 12 will be set for several pounds less than the regulator for pump 13 which will in turn be set several pounds lower than the regulator for pump 14. Assuming that it is desired to maintain a pressure of about 70 pounds per square inch in the supply conduit 11, the regulator for the smaller pump 12 might be set for about 67 pounds per square inch, the regulator for pump 13 for 70 pounds per square inch and the regulator for pump 14 for 73 pounds per square inch. With these settings, when the demand for water is low and flow through the pipe is low so that the drop is minimal, water will be delivered to the system at a relatively low pressure approximating that desired at the fixtures. As the demand increases, and the pressure drop due to flow correspondingly increases, the pumping system will supply water at a higher pressure to the main supply conduit so that the discharge pressure at the various fixtures will be maintained substantially constant.

While one embodiment of the invention has been shown and described herein, it will be understood that it is illustrative only and not to be taken as a definition of the scope of the invention, reference being had for this purpose to the appended claims.

What is claimed is:

1. A tankless pumping system comprising a plurality of pumps of different sizes, pressure regulators connecting the pumps respectively to a line to supply liquid thereto, the regulator for the smaller pump being adjusted to maintain a lower pressure than the regulator for the larger pump, and control means responsive to the rate of flow of liquid through the line to cause the smaller pump only to operate when the flow is below a predetermined value and the larger pump only to operate when the flow is above said value.

2. A tankless pumping system comprising a plurality of pumps of different sizes, pressure regulators connecting the pumps respectively to a line to supply liquid thereto, the regulator for the smaller pump being adjusted to maintain a lower pressure than the regulator for the larger pump, control means responsive to the rate of flow of liquid through the line to cause the smaller pump only to operate when the flow is below a low predetermined value, the larger pump only to operate when the flow is above said low value and below a higher predetermined value and both pumps to operate when the flow is above said higher value, and means controlled by the control means to make the regulator for the smaller pump ineffective when the flow is above said higher value.

3. A tankless pumping system comprising a pair of pumps connected in parallel between a source and a line conduit, a pressure regulator between each of the pumps and the line conduit, one of the pressure regulators being set to maintain a lower pressure than the other, control means responsive to flow through the line conduit to cause only the pump connected to said one of the regulators to operate when the flow is below a predetermined value and to cause both of the pumps to operate when the flow is at a higher value, and means operated by the control means when the flow is at said higher value and both pumps are operating to make ineffective said one of the regulators.

4. A tankless pumping system comprising a relatively small pump and a pair of larger pumps all connected in parallel between a source and a line conduit, a pressure regulator controlling the pressure supplied by each of the pumps to the line conduit, the regulator for the small pumps maintaining a lower pressure than the regulators for the larger pumps, control means responsive to flow through the line conduit to cause only the small pump to operate when the flow is below a predetermined low value, only one of the larger pumps to operate when the flow is above said value and below a second higher value, the small pump and one of the larger pumps to operate when the flow is above said second value and below a third still higher value, and both of the larger pumps to operate when the flow is above said third value, and means to make the regulator for the small pump ineffective when the flow is above said second value and below said third value.

5. A tankless pumping system comprising three pumps connected in parallel between a source and a line conduit, the first pump being relatively small and the second and third pumps being larger, pressure regulators controlling the pressures supplied by the respective pumps to the line conduit, the regulator for the first pump maintaining a relatively low pressure, the regulator for the second pump maintaining a higher pressure and the regulator for the third pump maintaining a still higher pressure, control means to cause the first pump only to operate when the flow is below a first value, the second pump only to operate when the flow is above the first value and below a second higher value, the first and second pumps to operate when the flow is above the second value and below a third still higher value and the second and third pumps to operate when the flow is above the third value, means to make the regulator for the first pump ineffective when the flow is above the second value and below the third value, and means to make the regulator for the second pump ineffective when the flow is above the third value.

6. The pumping system of claim 5 in which the first pump has a capacity of about twenty-five percent of the system peak flow rate and each of the second and third pumps has a capacity of about fifty-five percent of the system peak flow rate.

References Cited by the Examiner
UNITED STATES PATENTS

| | | | |
|---|---|---|---|
| 1,420,769 | 6/22 | Smith | 103—21 |
| 1,421,409 | 7/22 | Conrader | 103—21 |
| 2,512,799 | 6/50 | Huber. | |
| 2,562,615 | 7/51 | Huber. | |
| 2,741,986 | 4/56 | Smith | 103—11 |
| 2,888,875 | 6/59 | Buck | 103—11 |
| 3,005,411 | 10/61 | Metz | 103—11 |
| 3,068,795 | 12/62 | Lauck | 103—11 |
| 3,135,282 | 6/64 | Gray | 103—11 |

LAURENCE V. EFNER, *Primary Examiner.*